US006507350B1

(12) United States Patent
Wilson

(10) Patent No.: US 6,507,350 B1
(45) Date of Patent: Jan. 14, 2003

(54) FLAT-PANEL DISPLAY DRIVE USING SUB-SAMPLED $YC_BC_R$ COLOR SIGNALS

(75) Inventor: Andrew T. Wilson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,873

(22) Filed: Dec. 29, 1999

(51) Int. Cl.[7] ............................ H04N 9/64; G09G 5/04; G09G 3/20

(52) U.S. Cl. ........................ 345/690; 345/589; 345/204; 345/85; 248/791; 248/802

(58) Field of Search ............................ 345/32, 73, 204, 345/690, 694, 696, 3.1, 87, 88, 600, 603, 698, 904, 604, 589, 591, 593, 597, 83, 84; 382/149, 162, 166; 375/240.25; 348/708, 791–792, 802–803, 808, 599

(56) References Cited

U.S. PATENT DOCUMENTS 4,692,801 A * 9/1987 Ninomyia et al. .......... 358/133
5,642,139 A * 6/1997 Eglit .......................... 348/396
5,684,544 A * 11/1997 Astle .......................... 347/708
5,686,965 A * 11/1997 Auld .......................... 348/323
5,754,678 A * 5/1998 Hawthorne et al. ......... 382/149
5,917,462 A 6/1999 Suzuki et al. ................. 345/32
6,005,546 A * 12/1999 Keene ........................ 348/453
6,014,193 A * 1/2000 Taira et al. .................... 349/73
6,023,266 A * 2/2000 Eglit .......................... 345/202
6,078,307 A * 6/2000 Daly .......................... 345/603
6,236,433 B1 * 5/2001 Acharya et al. ............ 348/273
6,313,820 B1 * 11/2001 Helbing et al. ............... 345/96
6,353,440 B1 * 3/2002 Keene ........................ 345/603
6,441,587 B2 * 8/2002 Wicker et al. .............. 348/441

FOREIGN PATENT DOCUMENTS

EP 552639 * 1/1992 ............ H04N/7/00
EP 552020 * 7/1993 .......... H03H/17/06
EP 693852 * 1/1996 ............ H04N/1/40
JP 11-052350 2/1999

* cited by examiner

*Primary Examiner*—Jeffrey Brier
*Assistant Examiner*—Wesner Sajous
(74) *Attorney, Agent, or Firm*—Kenyon & Kenyon

(57) ABSTRACT

A method and device for adjusting the power consumption of a computer system are disclosed. A user application running on the computer system is arranged to operate in any one of a preselected number of operating modes. A power conservation module obtains power characteristics from a power information module, selects one of the preselected number of operating modes of the user application, as a function of the power characteristics obtained from the power information module, and causes the user application to operate in the selected operating mode.

19 Claims, 4 Drawing Sheets

FLAT-PANEL DISPLAY DRIVE USING SUB-SAMPLED $YC_BC_R$ COLOR SIGNALS

BACKGROUND OF THE INVENTION

The present invention pertains to a device for displaying video, graphics, and other visual data to a user via a flat-panel display. More specifically, a device is provided for reducing the number of signals needed to drive a display, and consequently reducing the number of active drive components in a flat-panel display.

Flat-panel displays such as liquid crystal display (LCD) screens are used on computer systems, especially portable computer systems such as lap-top and hand-held computers. In addition, flat-panel displays are increasingly being employed for use as televisions or for other display purposes (e.g., video conferencing). Flat-panel displays are displays used for displaying computer and other analog and digital data, where the depth of the display is greatly reduced compared to traditional cathode ray tube (CRT) technologies. CRT displays use an electron beam to stimulate phosphor "dots" on a glass screen into giving off light in a certain pattern to display data. Since the electron beam is located behind the screen and must "sweep" across it, the display must occupy a certain depth behind the screen. Flat panel displays employ technologies such as light emitting diode (LED), thin film transistor (TFT) LCD, Organic Light Emitting Diode (OLED), plasma display panel (PDP), plasma addressed liquid crystal display (PALD), field emission display (FED), and light emitting polymer (LEP) to display computer data without the requirement of occupying the space behind the display to the extent necessary in CRT systems.

Computer data is displayed on display screens of computer monitors. A flat-panel display screen such as an LCD screen contains pixels made up of cells which are illuminated in patterns to form images (letters, numbers, pictures, and other graphics). The cell is the smallest physical unit which makes up a computer graphics image. On certain video display screens, such as LCD screens, each cell includes a transparent electrode that operates to apply current to liquid crystals to allow or prevent light from passing through the screen. In the case of color screens, each cell may include a color filter to assign a color value to that cell. Cells are assigned one of the three basic display colors: red, blue, or green.

A pixel is a picture element and, from the perspective of computer software that outputs display data, it is the smallest element of a graphics image. For color display screens, each pixel includes three cells, one of each of the basic display colors. By varying the luminance (brightness) of each cell, the pixel can be used to display a whole range of colors. The display data and commands output by a software program are processed by a display driver and output as graphics data to a graphics controller, which controls the display of each pixel on the screen. The number of pixels capable of being displayed by the fixed number of dots on a screen is the resolution of the screen.

The display data and commands output by a software program are processed by a display driver and output as graphics data to a graphics controller, which controls the display of each pixel on the screen. With each pixel comprised of three color elements, each pixel is driven by three signals. Therefore, each two by two pixel block is driven by twelve discrete values. This requires a significant number of active electronic components to drive the signals for all these pixel elements and is a major cost in the designing and building of a flat-panel display.

In the example of digital video data display, a flat-panel display system employing current technology sends compressed digital video data to a digital video decoder. The digital video decoder decodes the compressed digital video data into luminance (Y) and chrominance ($C_b$, $C_r$) data. This $YC_bC_r$ data is then sent to a digital to analog converter (DAC) including color space conversion functionality, which converts it to analog RGB signals for the red, blue, and green cells of each pixel. This DAC employs a feature to convert digital luminance and chrominance values into analog RGB signals. The RGB signals applied to each cell control the brightness of the cell, and the combined brightness of each RGB cell creates the total color output and brightness for the relevant pixel. In systems such as this, each two-by-two block of pixels requires twelve signals to control it (three separate RGB signals for each pixel).

In the example of display of data output by the graphics portions of software programs, the data is generally output as RGB data. This data is temporarily stored in a frame buffer, and sent via a controller to the display, after conversion into analog signals by a DAC.

Flat-panel displays are generally designed to be thin, and are generally more expensive than traditional cathode ray tube (CRT) displays. Furthermore, in contrast to CRT displays, expanding the size of a flat-panel display requires adding additional components, which is also expensive. Reducing the number of signals required to control the display can save space and lead to significant cost savings by reducing the number of components required to control the display screen.

SUMMARY OF THE INVENTION

One embodiment of the present invention provides for a flat-panel display system including a flat-panel display screen including a plurality of pixels, a block of pixels including at least two of the plurality of pixels, a first drive circuit adapted to provide a luminance signal to each pixel in the block of pixels, a second drive circuit adapted to provide a first sub-sampled chrominance signal and a second sub-sampled chrominance signal to each block of pixels, at least one circuit adapted to latch the luminance and chrominance signals for each block, and at least one circuit adapted to generate a color display signal for a pixel from the luminance and chrominance signals sent to the pixel.

DETAILED DESCRIPTION

Figure 1:
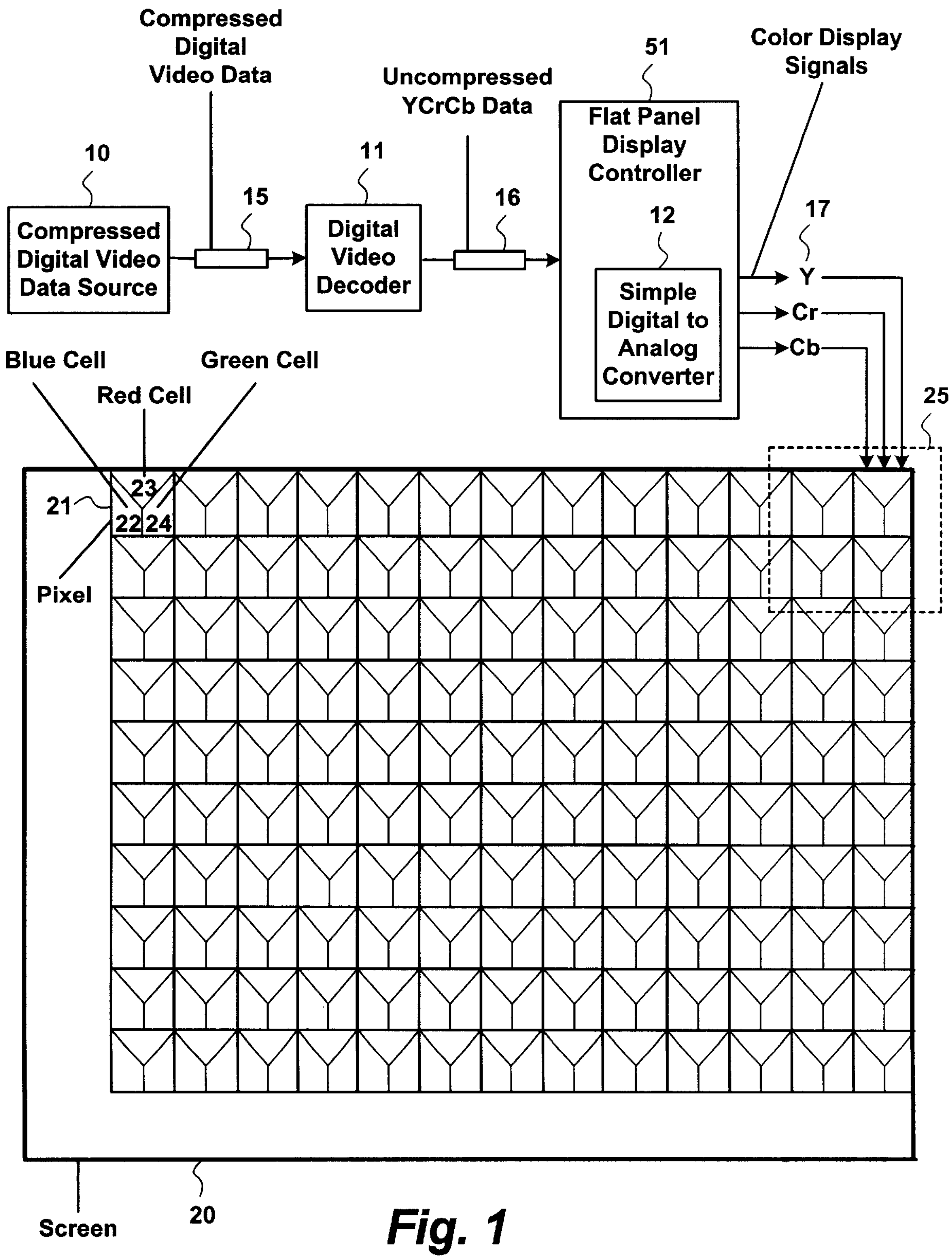
FIG. 1 is a schematic diagram of a flat-panel display system showing display of digital video data, according to an embodiment of the invention.

An embodiment of a computer display system according to the invention is shown in FIG. 1. This type of system may be used, for example, in a portable computer, or in a device designed primarily for the display of digital video data. In the example of display of video data, a source of compressed digital video data 10 provides compressed digital video data 15 to a digital video decoder 11. The digital video decoder 11 decodes the compressed digital video data into luminance (Y) and chrominance ($C_b$, $C_r$) data. characteristic of human vision. The magnitude of luminance is proportional to physical power. In that sense it is like intensity. The spectral composition of luminance is related to the brightness sensitivity of human vision. Luminance can be computed as a properly-weighted sum of linear-light red, green, and blue primary components. In video, for example, it is standard to compute a luma component Y' as a weighted sum of nonlinear R'G'B' primary components. This quantity is also often referred to as luminance.

Chrominance is a value that represents a numerical difference between color specifications. The perceptions of color differences can be highly nonuniform. Chrominance is the representation of a color, where information concerning brightness has been removed. When data capacity is at a premium, for example in the case of digital video transmission and storage, luminance data may be transmitted in full detail, while the chrominance (or color difference) data are transmitted with less detail. For example, the chrominance values may have spacial detail data removed by filtering, while luminance data is transmitted or stored in full detail.

Since the human retina has approximately twice as many rods as cones, luminance values are more important than chrominance values for transmitting data to be displayed. Therefore, chrominance values can be sub-sampled and used with full-detail luminance values, with very little degradation in image quality. This description covers methods such as employed in MPEG and JPEG systems. See Generic Coding of Moving Pictures and Associated Audio: Systems, Recommendation H.222.0, ISO/IEC 13818-1 , Apr. 25, 1995 ("MPEG 2 Specification"); JPEG Specification: "Digital Compression and Coding of Continuous-tone Still Images, Part 1, Requirements and Guidelines," ISO/IEC DIS 10918-1. The theory behind these methods (sub-Express sampling of chrominance data) may also be applied to reduce the active circuitry required for flat-panel displays.

In the embodiment shown in FIG. 1, the uncompressed $YC_bC_r$ data 16 is sent to a flat panel display controller 51. The display controller 51 may be, for example, a digital controller implemented as an integrated circuit. A simple digital to analog converter 12 may be included in the display controller 51, or it may be provided separately. This DAC 12 may be a simple DAC, which does not convert the $YC_bC_r$ data 16 to RGB data, but only converts the $YC_bC_r$ data 16 from digital data to analog color display signals 17. These analog color display signals 17 are sent to the flat-panel display to control the blue, red, and green cells 22, 23, 24 of each pixel 21.

Figure 2:
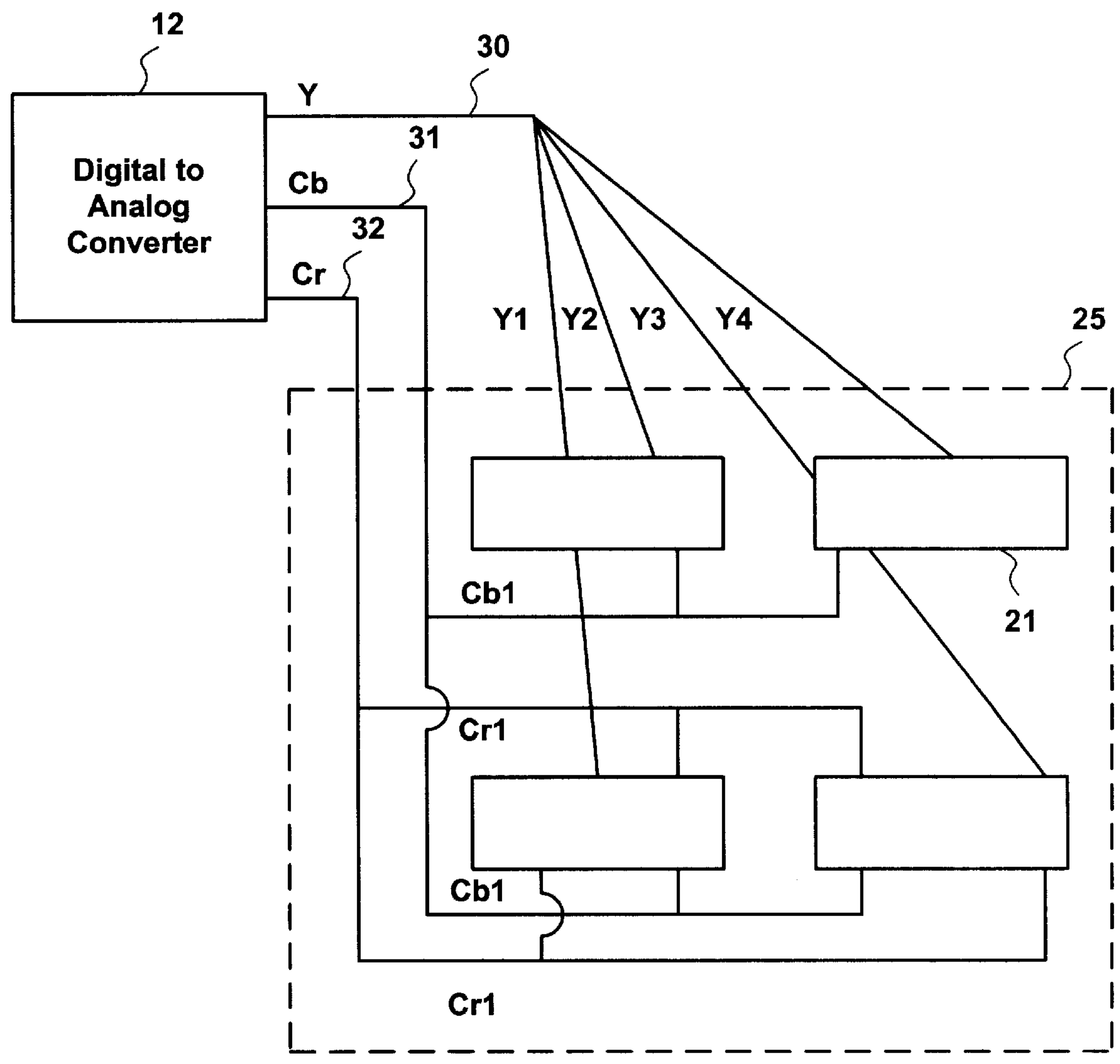
FIG. 2 is a schematic diagram showing the signals sent to a group of four pixels, according to an embodiment of the invention.

FIG. 2 shows an embodiment of the invention where a group of four pixels 25 is controlled by only six signals. The DAC 12 outputs three types of signals: luminance (Y) 30, blue chrominance ($C_b$) 31, and red chrominance ($C_r$) 32. As shown in FIG. 2, each pixel in the group of four receives a separate luminance signal 30 (Y1, Y2, Y3, Y4). Each pixel in the group, however, receives the same chrominance values $C_b$ 31 and $C_r$ 32. As can be seen in FIG. 2, only six signals are sent from the DAC to the flat-panel screen in this embodiment of the invention.

The $YC_bC_r$ signals sent to the flat-panel display by the DAC 12 may be processed by the display to input a value for each cell based on, for example, the following formulas:

$$R=(0.5643)(Y)+(1.402)(C_r);$$

$$G=(0.5643)(Y)-(0.1942)(C_b)-(0.403)(C_r);$$

$$B=(0.5643)(Y)+C_b.$$

These formulas are known in the art and are described, for example, in Poynton, Charles, "Frequently Asked Questions About Color," available from The formulas may be implemented on the flat-panel display using known circuitry elements such as active circuitry to latch the Y, $C_b$, and $C_r$ values for each block of pixels, and passive circuitry (e.g., gates and pull-down resistors) to multiply and add the signals.

The above-described system not only reduces the amount of active electronics and interconnects over the traditional flat-panel display (by reducing the number of signals required to operate the display), but this system also removes a conversion step required in other systems. While traditional display systems convert $YC_bC_r$ data into RGB data, before sending it to the display, in order to present digital video motion to a user, an embodiment of the invention removes this step. Instead, the $YC_bC_r$ data (converted to analog signals) directly drives the pixels of the display screen, without requiring the extra step of conversion to RGB data or signals.

The sub-sampling of the chrominance values may be accomplished according to any of a number of methods. For example, the chrominance value used for each block of four pixels may be the average of the chrominance values for the four pixels. Alternatively, the chrominance values of one of the four pixels may be selected to be a representative value, and applied to all four pixels in the group.

While digital video is generally represented in $YC_bC_r$ color space, computer generated graphics are typically represented in monochrome (1 bit/pixel) or in RGB color space. One example of RGB data is indexed color, typically a value of 8 bits per pixel used as an index into a lookup table of R/G/B triples stored in a memory. Another example of an implementation of RGB data display is direct color, with 5 or more bits per pixel used to control each color value.

Figure 3:
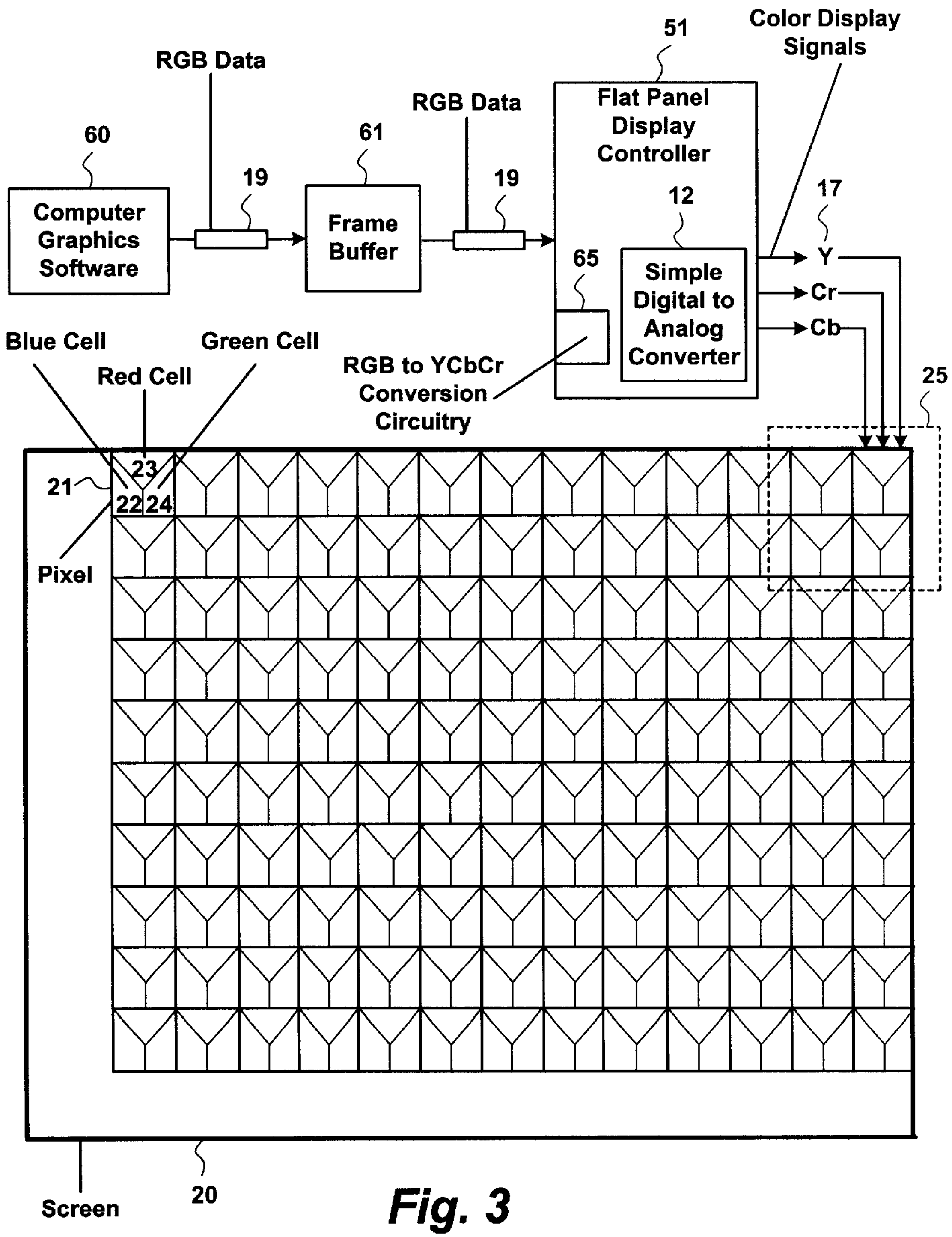
FIG. 3 is a schematic diagram of a flat-panel display system showing display of computer software graphics data, according to an embodiment of the invention.

FIG. 3 shows an embodiment of the invention for display of computer graphics data of the type typically output by software applications on a computer system (e.g., by an operating system, word processor, spreadsheet, game, or any other type of software application). At present, software applications for computer systems are generally designed to output RGB data for display by the computer's display system. Computer graphics software 60 (e.g., the graphics and graphical user interface (GUI) portions of software programs) outputs data values 19 for pixels in RGB format. This RGB graphics data 19 may be temporarily stored in a memory such as a frame buffer 61, from which the RGB data 19 is sent to the flat panel display controller 51.

To facilitate displaying computer graphics and digital video concurrently on the same physical display, software architectures have been developed to provide a common set of instructions and components to allow developers to be confident that their multimedia applications would run on widely used computer platforms, no matter what the hardware, and at the same time ensure that their products take advantage of high-performance hardware capabilities to achieve a desired performance. See, for example, the Microsoft® DirectX® components, available from Microsoft Corporation, Redmond, Wash.). Products such as these present an application programming interface (API) allowing programmers to write to multiple logical color "surfaces," each of which may overlap on the physical display. This overlapping may be performed by, for example tiling or overlaying display windows on a display screen.

Overlapping windows may be displayed as "opaque" so that only the top-most logical "surface" is displayed, or windows may be made semi-transparent using, for example, alpha blending techniques. In the case of alpha blending, mixdown may be controlled by a fourth "alpha" channel value for each pixel, which controls the transparency of the pixel value when blended with values for the same pixel representing other surfaces.

Resolution of the data output from the graphics portions of software programs (e.g., in logical color surfaces) may be performed, for example, by software, or by a hardware display controller such as, for example, an Intel® i740® (Intel Corporation, Santa Clara, Calif.), an ATI Rage 128 Pro™ (ATI Technologies Inc., Thornhill, ON Canada), or an nVidia™ Riva TNT™ (nVidia Corporation, Santa Clara, Calif.) display controller.

A display controller, for example, such as described above, may be adapted to implement a display system according to the invention by providing for the conversion from RGB data or monochrome data to $YC_bC_r$ data. Furthermore, these conversions may be implemented through software by, for example, adapting graphics portions of software applications to output $YC_bC_r$ data, or by creating a separate display controller module including software adapted to perform such conversions. In the embodiment shown in FIG. 3, a flat-panel display controller 51 converts RGB data to $YC_bC_r$ data. The flat panel display controller 51 includes circuitry for converting the RGB data output by the graphics software 60 into $YC_bC_r$ data that can be used by the flat panel display screen 20. This conversion circuitry 65 may use standard circuitry to implement, for example, the reverse conversion from the equations defined above for video. For example:

$$Y=(0.299)(R)+(0.587)(G)+(0.114)(B);$$

$$C_b=-(0.168736)(R)-(0.331264)(G)+(0.5)(B);$$

$$C_r=-(0.5)(R)-(0.418688)(G)-(0.081312)(B).$$

These conversions may be performed, for example, by conversion circuitry 65 that is essentially the reverse of circuitry currently used in such controllers for converting $YC_bC_r$ such as video data into RGB data for RGB display systems. The conversion circuitry 65 may also include circuitry for converting monochrome graphics data into monochrome $YC_bC_r$ by, for example, multiplying the monochrome brightness value by a constant to convert it into a luminance (Y) value.

As in FIG. 1, the $YC_bC_r$ signals are output by the flat panel display controller 51, via a digital to analog converter 12. As described for FIG. 1, this converter may be integrated into the controller 51, or it may be located separate from the controller 51. The analog $YC_bC_r$ signals are output to the pixels 21 of the display 20, as described above. In the embodiment shown in FIG. 3, software programs designed to output RGB graphics data do not require modification for display on the flat-panel display system using sub-sampled $YC_bC_r$ signals.

Figure 4:
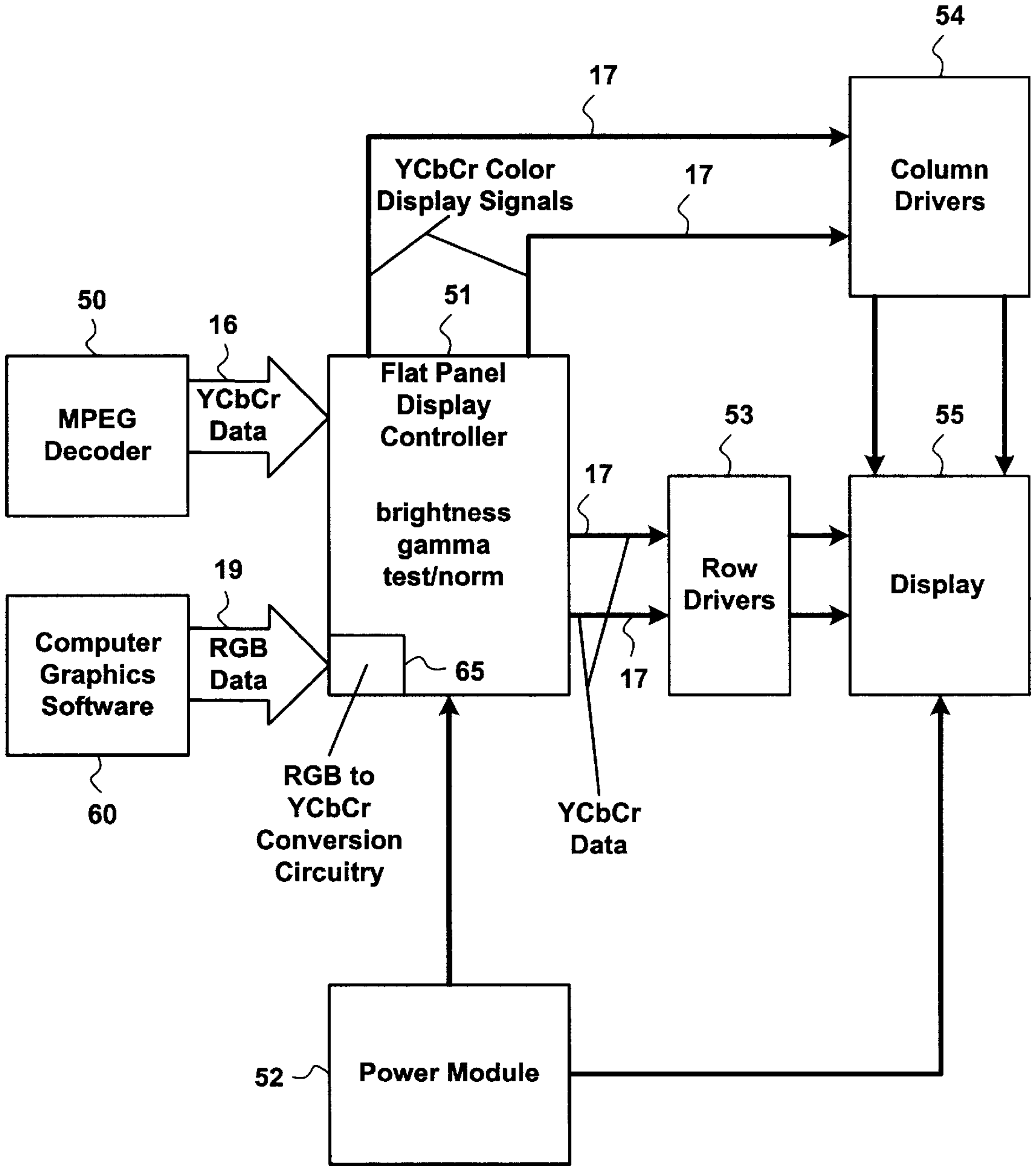
FIG. 4 is a block diagram of a flat-panel display system according to an embodiment of the invention.

Another example of a display system, according to an embodiment of the invention, is shown in FIG. 4. An MPEG decoder 50 sends $YC_bC_r$ data 16 to a controller 51. The controller 51 may include a digital/analog converter as well as controller circuitry or software to control the row drivers 53 and column drivers 54. In this example, the row driver 53 provides only the row select data, while the column driver 54 provides the display signals to the cells of each pixel in the display 55. The power supply 52 may include, for example, a low voltage subsystem for providing logic and switching voltages to the row and column drivers, and a higher voltage section for providing an anode voltage to the display screen 55.

In one embodiment of the invention, a power conservation mode may be implemented by eliminating the chrominance signals and displaying only the luminance signal. This will effectively convert the display into a monochrome display, so that it is still usable, but it will consume less power because the power normally consumed by the chrominance signals will be conserved. Such a power-saving mode may be useful, for example, for a portable (lap-top) computer. In this case, it may be desirable to offer the user the option of a full-color display, for example, when the computer is plugged in to a power source, and also the option of a power conserving monochrome display for use when the computer is operating with a battery as its power source.

In the embodiment shown in FIG. 4, the display controller 51 or power module 52 may switch off the chrominance signals ($C_b$,$C_r$) for example, by switching off the power to the signals from the power module 52. In this case, only luminance (Y) signals will be sent to the pixels 21 of the display, and graphics data will be displayed on the flat panel display in monochrome, while saving power. In a further embodiment of the invention, power may be switched off to chrominance signals only for certain selected pixels (for example pixels in a certain window, or pixels in the background such as the so-called "wall paper" portion of the screen controlled, for example, by the operating system). In this embodiment, software or hardware may be used so that the user views a selected window in color while other areas of the screen appear in monochrome, thus saving power while retaining some color functionality.

In another embodiment of the invention, a function is applied in circuitry, for example, on the flat-panel display to adjust the chrominance and luminance values for spatially adjacent pixels using, for example, a standard interpolation technique. An interpolation technique such as linear or bi-linear interpolation may be implemented in this manner to smooth or sharpen a displayed image.

Although an embodiment of the invention has been described in terms of an LCD flat-panel screen, it is to be understood that the scope of the invention, as defined in the claims, is broader than this exemplary application. The present invention, as defined in the claims, may be applied to any type of flat-panel display screen, including a light emitting diode (LED), thin film transistor (TFT) LCD, Organic Light Emitting Diode (OLED), plasma display panel (PDP), plasma addressed liquid crystal display (PALD), field emission display (FED), or light emitting polymer (LEP) display. Furthermore, it is to be understood that certain components of the invention described above as being implemented in software may be implemented in hardware (e.g., a digital video decoder), and certain components of the invention described above as being implemented in hardware may be implemented in software (e.g., a digital to analog converter), or a combination of hardware and software, within the scope of the invention.

What is claimed is:

1. A flat-panel display system comprising:

a flat-panel display screen including a plurality of pixels;

a block of pixels including at least two of the plurality of pixels;

a first drive circuit adapted to provide a luminance signal to each pixel in the block of pixels;

a second drive circuit adapted to provide a first sub-sampled chrominance signal and a second sub-sampled chrominance signal to the block of pixels, and to distribute said first subsampled chrominance signal and said second sub-sampled chrominance signal to each pixel in the block of pixels;

at least one circuit adapted to latch the luminance and chrominance signals for each pixel in the block of pixels; and at least one circuit adapted to generate a color display signal for a pixel from the luminance and chrominance signals sent to the pixel.

2. The flat-panel display system of claim 1, wherein:

the at least one circuit adapted to generate a color display signal for a pixel from the luminance and chrominance signals sent to the pixel generates one of a red, a blue, and a green signal.

3. The flat-panel display system of claim 1, wherein:

the at least one circuit adapted to generate a color display signal for a pixel from the luminance and chrominance signals sent to the pixel generates a red signal by:

multiplying the luminance signal by a first constant to create an adjusted luminance signal;

multiplying the first chrominance signal by a second constant to create a first adjusted chrominance signal;

summing the adjusted luminance signal and the first adjusted chrominance signal.

4. The flat-panel display system of claim 1, wherein:

the at least one circuit adapted to generate a color display signal for a pixel from the luminance and chrominance signals sent to the pixel generates a green signal by:

multiplying the luminance signal by a first constant to create an adjusted luminance signal;

multiplying the first chrominance signal by a second constant to create a first adjusted chrominance signal;

multiplying the second chrominance signal by a third constant to create a second adjusted chrominance signal; and subtracting the first adjusted chrominance signal and the second adjusted chrominance signal from the adjusted luminance signal.

5. The flat-panel display system of claim 1, wherein:

the at least one circuit adapted to generate a color display signal for a pixel from the luminance and chrominance signals sent to the pixel generates a blue signal by:

multiplying the luminance signal by a first constant to create an adjusted luminance signal;

multiplying the second chrominance signal by a second constant to create a second adjusted chrominance signal;

summing the adjusted luminance signal and the second adjusted chrominance signal.

6. The flat-panel display system of claim 1, further comprising:

a first circuit adapted to generate a red color display signal for a pixel from the luminance and chrominance signals sent to the pixel by:

multiplying the luminance signal by a first constant to create an adjusted luminance signal;

multiplying the first chrominance signal by a second constant to create a first adjusted chrominance signal;

summing the adjusted luminance signal and the first adjusted chrominance signal;

a second circuit adapted to generate a green color display signal for a pixel from the luminance and chrominance signals sent to the pixel by:

multiplying the luminance signal by the first constant to create the adjusted luminance signal;

multiplying the first chrominance signal by a third constant to create a second adjusted chrominance signal;

multiplying the second chrominance signal by a fourth constant to create a third adjusted chrominance signal; and subtracting the second adjusted chrominance signal and the third adjusted chrominance signal from the adjusted luminance signal;

a third circuit adapted to generate a blue color display signal for a pixel from the luminance and chrominance signals sent to the pixel by:

multiplying the luminance signal by the first constant to create an adjusted luminance signal;

multiplying the second chrominance signal by a fifth constant to create a fourth adjusted chrominance signal;

summing the adjusted luminance signal and the fourth adjusted chrominance signal.

7. The flat-panel display system of claim 6, wherein:

the first constant is 0.5643;

the second constant is 0.7912;

the third constant is 0.1942;

the fourth constant is 0.4030; and the fifth constant is 1.000.

8. A flat-panel display system comprising:

a flat-panel display screen including a plurality of pixels;

a block of pixels including at least two of the plurality of pixels;

a display controller including conversion circuitry for converting red, green, blue graphics data to chrominance and luminance data;

a first drive circuit adapted to provide a luminance signal to each pixel in the block of pixels;

a second drive circuit adapted to provide a first sub-sampled chrominance signal and a second sub-sampled chrominance signal to the block of pixels, and to distribute said first sub-sampled chrominance signal and said second sub-sampled chrominance signal to each pixel in the block of pixels;

at least one circuit adapted to latch the luminance and chrominance signals for each pixel in the block of pixels;

at least one circuit adapted to generate a color display signal for a pixel from the luminance and chrominance signals sent to the pixel.

9. The flat-panel display system of claim 8, further comprising:

a display controller including conversion circuitry for converting monochrome graphics data to luminance data.

10. The flat-panel display system of claim 8, wherein:

the red, green, blue graphics data represents a color logical surface.

11. The flat-panel display system of claim 10, wherein:

an alpha channel is used to control a transparency of the red, green, blue graphics data representing the color logical surface.

12. The flat-panel display system of claim 8, wherein:

a power-saving mode is implemented by switching off power to at least one of the first sub-sampled chrominance signal and the second sub-sampled chrominance signal.

13. The flat-panel display system of claim 8, further comprising:

interpolation circuitry for implementing an interpolation technique on at least one of the luminance signal, the first sub-sampled chrominance signal, and the second sub-sampled chrominance signal.

14. A method for displaying data on a flat-panel display system including a block of pixels, comprising:

sending a unique luminance signal to each pixel in the block of pixels;

sub-sampling a red chrominance signal and a blue chrominance signal for the block of pixels;

distributing the red chrominance signal to each pixel in the block of pixels; and distributing the blue chrominance signal to each pixel in the block of pixels.

15. The method of claim 14, further comprising:

multiplying the luminance signal by a first constant to create an adjusted luminance signal;

multiplying the red chrominance signal by a second constant to create an adjusted red chrominance signal;

summing the adjusted luminance signal and the adjusted red chrominance signal;

multiplying the red chrominance signal by a third constant to create a second adjusted red chrominance signal;

multiplying the blue chrominance signal by a fourth constant to create an adjusted blue chrominance signal; and subtracting the second adjusted red chrominance signal and the adjusted blue chrominance signal from the adjusted luminance signal;

multiplying the blue chrominance signal by a fifth constant to create a second adjusted blue chrominance signal;

summing the adjusted luminance signal and the second adjusted blue chrominance signal.

16. The method of claim 15, wherein:

the first constant is 0.5643;

the second constant is 0.7912;

the third constant is 0.1942;

the fourth constant is 0.4030; and the fifth constant is 1.000.

17. The method of claim 14, further comprising:

implementing a power-saving mode by switching off power to at least one of the first sub-sampled chrominance signal and the second sub-sampled chrominance signal.

18. The flat panel display system of claim 1, wherein:

power is switched off to the chrominance signal of a first selected pixel while power is maintained to the chrominance signal of a second selected pixel.

19. The flat panel display system of claim 1, further comprising:

circuitry for adjusting the chrominance signals and the luminance signals of a first pixel and a second pixel using one of a linear and a bi-linear interpolation technique, wherein:

the first pixel is spatially adjacent to the second pixel.

* * * * *